United States Patent [19]

(12) United States Patent
Sato (10) Patent No.: US 9,307,068 B2
(45) Date of Patent: Apr. 5, 2016

(54) INFORMATION PROCESSING APPARATUS AND COMMUNICATION PROCESSING METHOD THEREOF

(75) Inventor: Ryosuke Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 356 days.

(21) Appl. No.: 12/703,717

(22) Filed: Feb. 10, 2010

(65) Prior Publication Data

US 2010/0235497 A1     Sep. 16, 2010

(30) Foreign Application Priority Data

Mar. 11, 2009   (JP) ................................ 2009-058700

(51) Int. Cl.
*H04L 29/06* (2006.01)
*H04M 1/725* (2006.01)
(Continued)

(52) U.S. Cl.
CPC ............ *H04M 1/7253* (2013.01); *H04L 29/06* (2013.01); *H04L 67/04* (2013.01); *H04L 69/18* (2013.01); *H04L 69/40* (2013.01); *H04W 12/06* (2013.01); *H04W 52/0251* (2013.01)

(58) Field of Classification Search
CPC .................. H04L 27/2607; H04M 2203/5018; H04M 3/56; H01R 13/7135; H04W 88/04
USPC .......... 709/203, 217, 218, 219, 223, 224, 227
See application file for complete search history.

(56) References Cited

U.S. PATENT DOCUMENTS

| 7,031,565 B2 | 4/2006 | Akashi et al. .................... 385/18 |
| 2002/0116485 A1* | 8/2002 | Black ...................... H04L 29/06 709/223 |

(Continued)

FOREIGN PATENT DOCUMENTS

| JP | 2000-156689 | 6/2000 |
| JP | 2004-180077 | 6/2004 |

(Continued)

OTHER PUBLICATIONS

Japanese Office Action dated Apr. 30, 2013 issued in corresponding Japanese Patent Application No. 2009-058700.

*Primary Examiner* — Barbara Burgess
(74) *Attorney, Agent, or Firm* — Fitzpatrick, Cella, Harper & Scinto (57) ABSTRACT

An information processing apparatus including a first communication interface for individually communicating with a plurality of communication terminals without involvement of a public network and a second communication interface for communicating with involvement of a public network, wherein the apparatus provides services, via the first communication interface or via the first communication interface and the second communication interface, to a plurality of communication terminals that perform communication via the first communication interface, manages information regarding a communication interface used by each service and information regarding the service provided, and controls communication performed with the first and the second communication interfaces based on the managed information. When disconnection of communication performed with either one of the first and the second communication interfaces has been detected, the apparatus performs control relating to disconnection of communication performed with the communication interface in which disconnection was not detected based on the managed information.

6 Claims, 8 Drawing Sheets

(51) Int. Cl.
*H04W 12/06* (2009.01)
*H04L 29/08* (2006.01)
*H04L 29/14* (2006.01)
*H04W 52/02* (2009.01)

(56) References Cited

U.S. PATENT DOCUMENTS

| | | | |
|---|---|---|---|
| 2002/0143956 A1* | 10/2002 | Tanimoto | 709/227 |
| 2003/0120772 A1* | 6/2003 | Husain et al. | 709/224 |
| 2003/0224757 A1* | 12/2003 | Dyck | H04L 29/06 455/411 |
| 2004/0116140 A1* | 6/2004 | Babbar et al. | 455/517 |
| 2005/0128514 A1* | 6/2005 | Wanda et al. | 358/1.15 |
| 2007/0002891 A1 | 1/2007 | Shinoda | |
| 2007/0109960 A1* | 5/2007 | Feng | 370/219 |
| 2007/0121562 A1* | 5/2007 | Lai et al. | 370/338 |
| 2007/0230605 A1* | 10/2007 | Osseiran et al. | 375/260 |
| 2007/0233844 A1 | 10/2007 | Tanimoto | 709/223 |
| 2008/0117884 A1* | 5/2008 | Ishii | H04W 12/06 370/338 |
| 2009/0009003 A1* | 1/2009 | Roth et al. | 307/75 |
| 2009/0232037 A1* | 9/2009 | Dixit et al. | 370/311 |
| 2009/0286577 A1* | 11/2009 | Yang et al. | 455/574 |
| 2010/0058085 A1* | 3/2010 | Chien et al. | 713/320 |
| 2011/0026535 A1* | 2/2011 | Ajitomi et al. | 370/401 |
| 2011/0264943 A1* | 10/2011 | Hori et al. | 713/324 |

FOREIGN PATENT DOCUMENTS

| | | |
|---|---|---|
| JP | 2007-13411 A | 1/2007 |
| JP | 2007-129605 A | 5/2007 |
| JP | 2007-208810 A | 8/2007 |
| JP | 2007-267138 | 10/2007 |
| JP | 2008-092600 | 4/2008 |
| JP | 2010-40170 A * | 2/2010 |

* cited by examiner

STATUS MANAGEMENT TABLE

| No. | SERVICE REQUEST SOURCE | TYPE OF SERVICE EXECUTED | COMMUNICATION INTERFACE USED |
|---|---|---|---|
| 1 | NOTEBOOK PC 11 | ADDRESS BOOK ACQUISITION | WIRELESS LAN NETWORK |
| 2 | CAMERA 12 | EMAIL TRANSMISSION | WIRELESS LAN NETWORK / PUBLIC NETWORK |
| 3 | GAME MACHINE 13 | INTERNET CONNECTION | WIRELESS LAN NETWORK / PUBLIC NETWORK |
| 4 | MOBILE PHONE 1 | EMAIL RECEPTION | PUBLIC NETWORK |

STATUS MANAGEMENT TABLE

| No. | SERVICE REQUEST SOURCE | TYPE OF SERVICE EXECUTED | COMMUNICATION INTERFACE USED |
|---|---|---|---|
| 1 | NOTEBOOK PC 11 | ADDRESS BOOK ACQUISITION | WIRELESS LAN NETWORK |
| 2 | CAMERA 12 | EMAIL TRANSMISSION | WIRELESS LAN NETWORK / PUBLIC NETWORK |

INFORMATION PROCESSING APPARATUS AND COMMUNICATION PROCESSING METHOD THEREOF

BACKGROUND OF THE INVENTION

1. Field of the Invention

The present invention relates to an information processing apparatus and a communication processing method thereof.

2. Description of the Related Art

In recent years, information processing apparatuses (e.g., mobile phones) have been commercialized that are equipped with a short-range wireless communication functionality via interfaces such as IEEE 802.11 wireless LAN and Bluetooth®. In addition, a mobile phone has been proposed in Japanese Patent Laid-Open No. 2004-180077 that is equipped with a function (data transfer service) of relaying data via short-range wireless communication and public network communication and connecting a terminal (short-range wireless communication terminal) that is connected via short-range wireless communication and a terminal (network terminal) located on the Internet. With this proposal, data transmission and reception between a short-range wireless communication terminal and a network terminal becomes possible.

Conventionally, for relay terminals that relay data between a plurality of interfaces, techniques have been proposed in which, if a failure occurs in communication performed by one interface, another interface carries out the process or processes associated with the failure (Japanese Patent Laid-Open Nos. 2000-156689, 2008-92600 and 2007-267138). Japanese Patent Laid-Open No. 2000-156689 has proposed, for access points, a technique in which an apparatus connected with a wireless interface is disconnected when a connection to a node connected with a wired interface is disconnected. Japanese Patent Laid-Open No. 2008-92600 has disclosed, for hands-free telephone intercom systems in which a telephone device is wirelessly connected to a mobile phone, a technique for controlling the status of connection to the other telephone apparatus according to the status of wireless connection between the mobile phone and the telephone device. Japanese Patent Laid-Open No. 2007-267138 has disclosed, for relay apparatuses that support a tunneling technique for connecting networks, a technique for managing the status of connection of a tunnel that is used in a shared manner by a plurality of terminals within a network by monitoring the status of use of the tunnel by the terminals.

It is expected that, in the future, mobile phones will provide, in addition to the data transfer service described above, a plurality of services to other communication terminals. Such services include services that use only short-range wireless communication and services that use both short-range wireless communication and public network communication. It is also expected that such services will be used simultaneously by a plurality of communication terminals that are connected to such a mobile phone.

The above conventional techniques, however, do not give consideration to a relay apparatus that simultaneously executes a plurality of different services.

In addition, mobile phones are required to reduce power consumption as much as possible, so it is desirable that mobile phones control communication while taking power consumption into consideration when providing services to other communication terminals.

SUMMARY OF THE INVENTION

The present invention provides a technique with which it is possible to simultaneously provide a plurality of services via a plurality of communication interfaces and to accurately disconnect communication that is performed with each communication interface.

According to a first aspect of the present invention, there is provided an information processing apparatus including a first communication interface for individually communicating with a plurality of communication terminals without involvement of a public network and a second communication interface for communicating with involvement of a public network, the apparatus comprising: a service control unit configured to provide services, via the first communication interface or via the first communication interface and the second communication interface, to the plurality of communication terminals that perform communication via the first communication interface; a disconnection detection unit configured to detect disconnection of communication performed with at least one of the first communication interface and the second communication interface; a management unit configured to manage information regarding a communication interface used by each service provided by the service control unit and information regarding the service provided by the service control unit; and a communication control unit configured to control communication performed with the first communication interface and the second communication interface based on the information managed by the management unit, wherein where disconnection of communication performed with either one of the first communication interface and the second communication interface has been detected by the disconnection detection unit, the communication control unit performs control relating to disconnection of communication performed with the communication interface in which disconnection was not detected by the disconnection detection unit based on the information managed by the management unit.

According to a second aspect of the present invention, there is provided a communication processing method of an information processing apparatus including a first communication interface for individually communicating with a plurality of communication terminals without involvement of a public network and a second communication interface for communicating with involvement of a public network, the method comprising: controlling services so as to provide services, via the first communication interface or via the first communication interface and the second communication interface, to the plurality of communication terminals that perform communication via the first communication interface; detecting disconnection of communication performed with at least one of the first communication interface and the second communication interface; managing information regarding a communication interface used by each service provided in the service control step and information regarding the service provided in the service control step; and controlling communication performed with the first communication interface and the second communication interface based on the information managed in the management step, wherein where disconnection of communication performed with either one of the first communication interface and the second communication interface has been detected in the disconnection detection step, in the communication control step, control relating to disconnection of communication performed with the communication interface in which disconnection was not detected in the disconnection detection step is performed based on the information managed in the management step.

Further features of the present invention will be apparent from the following description of exemplary embodiments with reference to the attached drawings.

DESCRIPTION OF THE EMBODIMENTS

An exemplary embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

Figure 1:
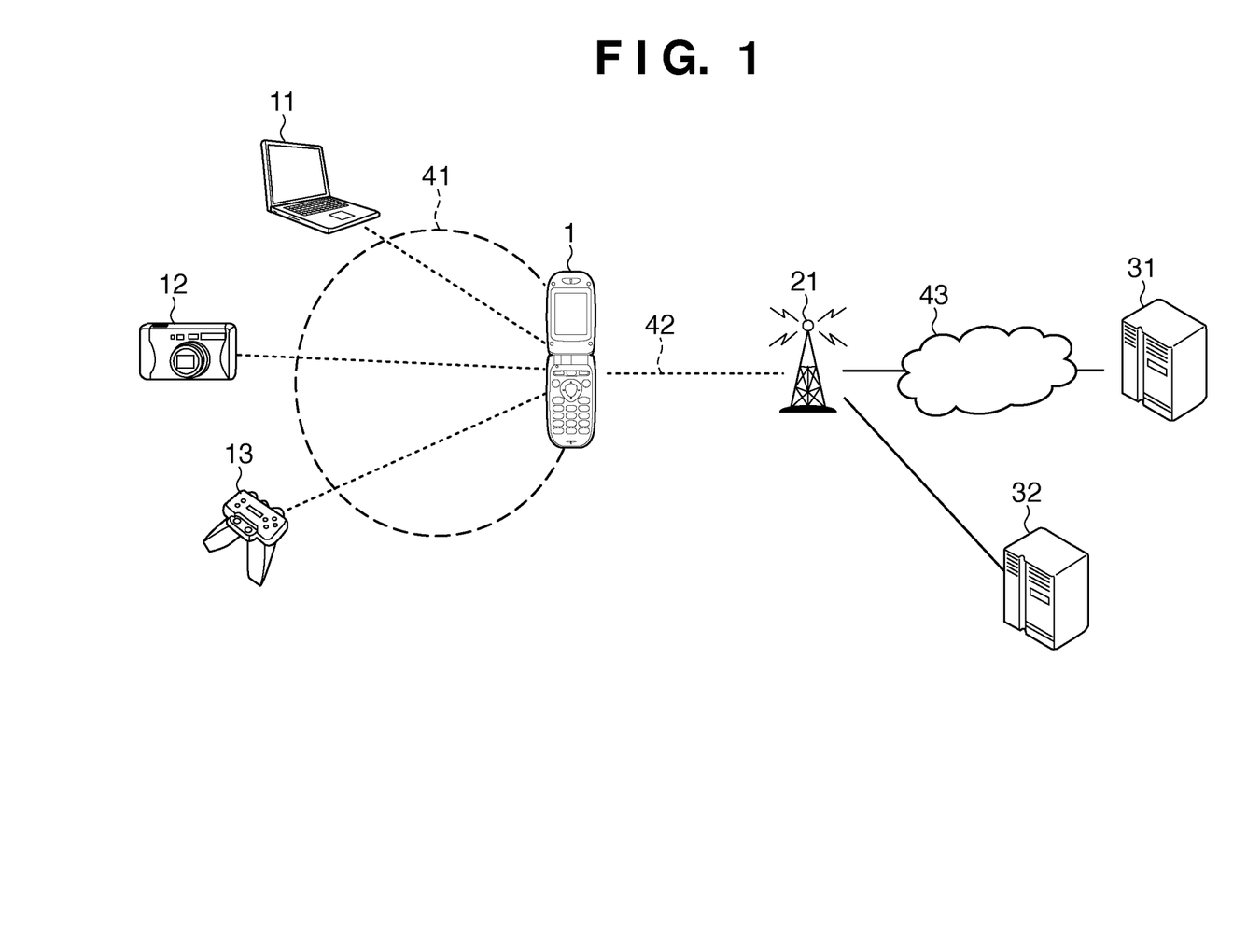
FIG. 1 is a diagram showing an example of a configuration of a communication system according to an embodiment of the present invention.

FIG. 1 is a diagram showing an example of a configuration of a communication system according to an embodiment of the present invention.

The communication system is configured to include a mobile phone 1, a notebook personal computer 11 (hereinafter also referred to as a notebook PC), a camera 12, a game machine 13, a base station 21, a web server 31 and a mobile phone web (e.g., I-mode®) server 32. The mobile phone 1, the notebook PC 11, the camera 12 and the game machine 13 are connected with an IEEE 802.11-based wireless LAN network 41 (hereinafter also referred to as a wireless LAN communication network). The mobile phone 1 is also connected to the base station 21 via a public line network 42 (hereinafter also referred to as a public network).

The mobile phone 1 is equipped with a function of relaying a variety of data between the wireless LAN communication network and the public network. That is, the mobile phone 1 is equipped with a function (data transfer service) of relaying data communication between communication terminals (the notebook PC 11, the camera 12, the game machine 13) that are connected by the wireless LAN and terminals that are located on the Internet (the web server 31, the mobile phone web server 32). In addition, the mobile phone 1 also provides other functions (services) such as an address book acquisition service, an email transmission service, a download service, an Internet connection service (e.g., GPS data reception), and so on.

A computer is incorporated in the mobile phone 1, the notebook PC 11, the camera 12, the game machine 13, the base station 21, the web server 31, the mobile phone web server 32 and the like that were described above. The computer includes a main control unit, such as a CPU, and storage units such as a ROM (Read Only Memory), a RAM (Random Access Memory) and a HDD (Hard Disk Drive). The computer also includes input and output units such as a keyboard, a mouse, a display and buttons or a touch panel. These constituent units are connected by a bus or the like, and controlled by the main control unit executing a program stored in a storage unit.

Figure 2:
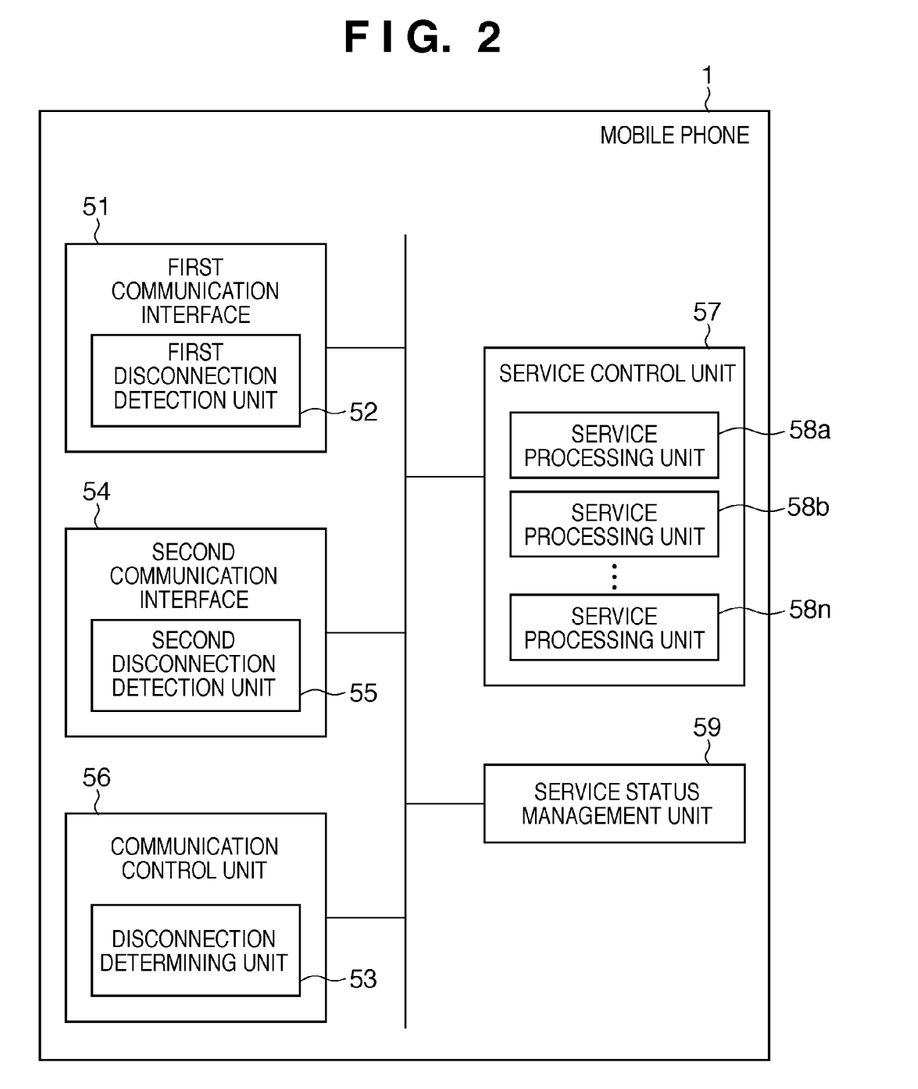
FIG. 2 is a diagram showing an example of a functional configuration of a mobile phone 1 shown in FIG. 1.

FIG. 2 is a diagram showing an example of a functional configuration of the mobile phone 1 shown in FIG. 1.

The mobile phone 1 is configured to include a first communication interface 51, a second communication interface 54, a communication control unit 56, a service control unit 57 and a service status management unit 59.

The first communication interface 51 is used for communication via the wireless LAN network 41. The first communication interface 51 is provided with a first disconnection detection unit 52 that detects disconnection of communication performed with the first communication interface 51. The communication performed with the first communication interface 51 does not necessarily involve the use of a wireless LAN network. The first communication interface 51 may be, for example, a communication interface that uses communication protocols such as wireless USB, Bluetooth and RFID (Radio Frequency Identification). Other than the above, it is also possible to use proximity wireless transfer (non-contact communication) such as NFC (Near Field Communication) and TransferJet, wired communication such as USB (Universal Serial Bus), and so on. That is, the first communication interface 51 may be any interface as long as it is an interface that does not use a public network and is capable of individually controlling (e.g., disconnecting, connecting, and the like) communication with each communication terminal.

The second communication interface 54 is used for communication with the public line network 42. The second communication interface 54 is provided with a second disconnection detection unit 55 that detects disconnection of communication performed with the second communication interface 54.

The communication control unit 56 controls communication performed with the communication interface (the first communication interface 51, the second communication interface 54). The communication control unit 56 controls (e.g., disconnects and connects) the communication interface, manages the power source of the communication interface, performs transition to a power saving mode, and so on. In addition, the communication control unit 56 is provided with a disconnection determining unit 53. The disconnection determining unit 53 determines, when disconnection is detected by the disconnection detection unit (the first disconnection detection unit 52, the second disconnection detection unit 55), which communication interface or which communication terminal is to be disconnected. Such a determination is made based on the information managed by the service status management unit 59.

The service control unit 57 controls various services provided by the mobile phone 1. The service control unit 57 is provided with one or a plurality of service processing units 58 (plural in this case) that perform a process corresponding to each service. The service processing units 58 can simultaneously provide a plurality of services to the communication terminals connected via a communication interface.

Figure 3:
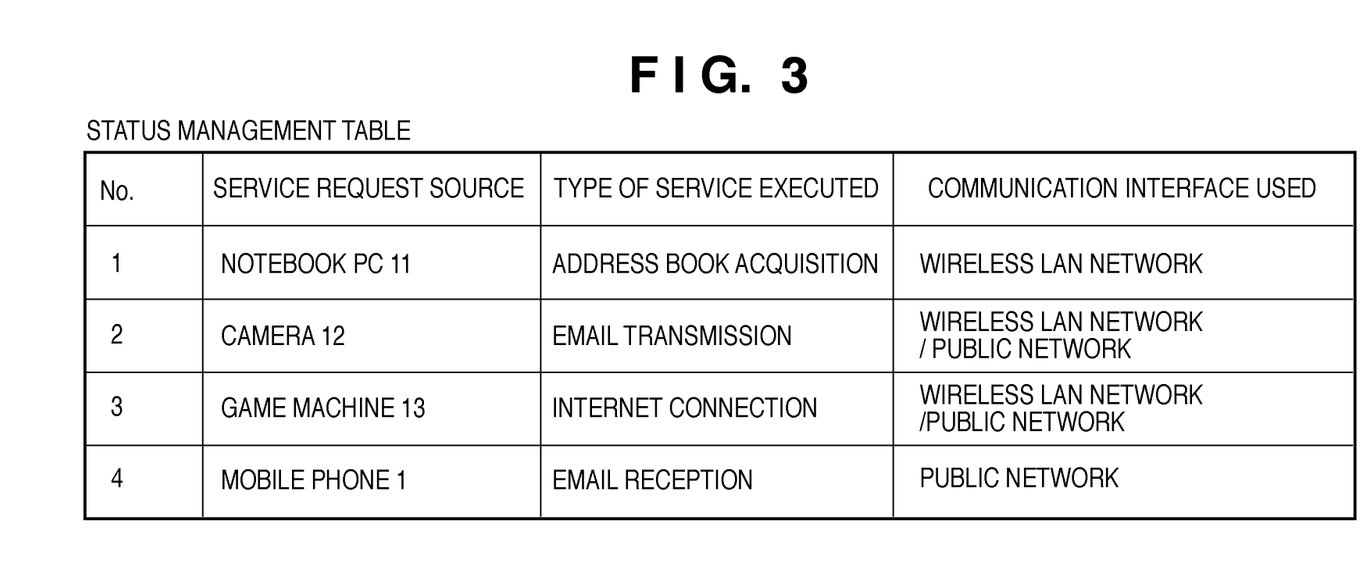
FIG. 3 is a diagram showing an example of a table layout of a status management table.

The service status management unit 59 manages the status of service execution, information regarding a communication interface used by each service during execution, and so on. The service status management unit 59 manages such information by using, for example, a status management table. As shown in FIG. 3, a terminal that has made a request to execute a service, the type of the service, a communication interface used by the service, and so on are stored in association with one another in the status management table.

Figure 4:
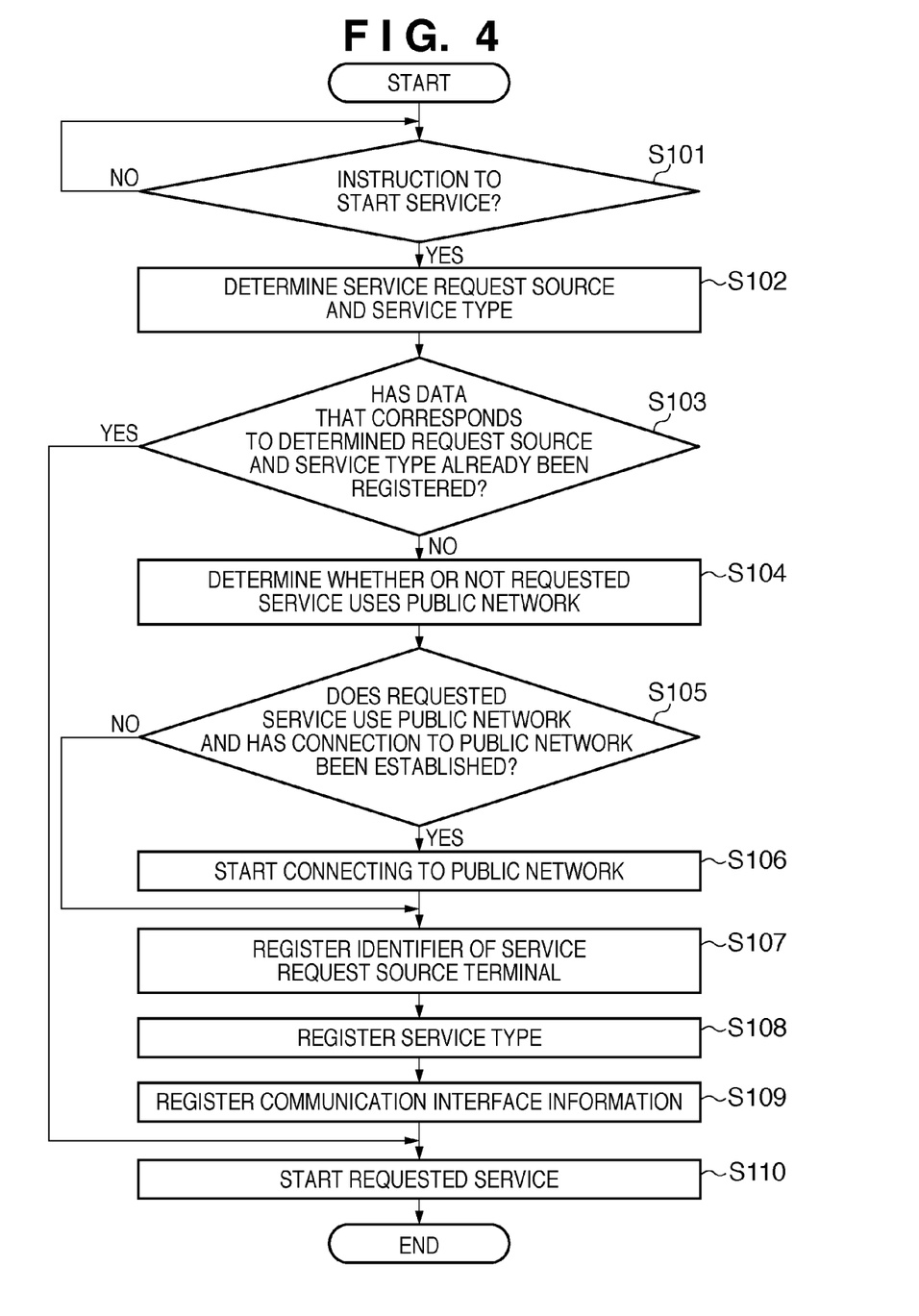
FIG. 4 is a flowchart showing an example of an operation of the mobile phone 1 shown in FIGS. 1 and 2.

An example of an operation of the mobile phone 1 shown in FIGS. 1 and 2 will be described now with reference to FIG. 4. Here, a process for starting a service performed by the mobile phone 1 will be described.

This process starts upon receipt of, for example, an instruction or request to start a service from another communication terminal or upon receipt of an instruction to start a service made by an operator's operation (YES in S101). When this process starts, the mobile phone 1, with the use of the service control unit 57, determines a request source that has made the instruction to start a service and the type of the requested service (S102).

After this determination, the mobile phone 1, with the use of the service status management unit 59, determines whether or not data that corresponds to the determined request source and service type has already been registered in the status management table.

As a result, if it is determined that the corresponding data has already been registered (YES in S103), the mobile phone 1, with the use of the service control unit 57, starts the requested service (S110) and then ends the process. If, on the other hand, it is determined that the corresponding data has not been registered (NO in S103), the mobile phone 1, with the use of the service control unit 57, determines whether or not the requested service uses a public network to start the service as instructed (S104). As a result, if it is determined that the requested service uses a public network and the mobile phone 1 is not connected to a public network (YES in S105), the mobile phone 1, with the use of the communication control unit 56, starts connecting to a public network (S106). After that, the mobile phone 1 advances to a service information registration process spanning from S107 to S109. If, on the other hand, the requested service does not use a public network, or if the requested service uses a public network, but a connection to a public network has already been established (NO in S105), the mobile phone 1 advances to the service information registration process spanning from S107 to S109.

When the service information registration process starts, the mobile phone 1, with the use of the service status management unit 59, registers the identifier of the service request source terminal, the service type and the communication interface used by the service in the status management table (S107 to S109). After this registration process ends, the mobile phone 1, with the use of the service control unit 57, starts the requested service (S110). Then, this process ends.

Figure 5:
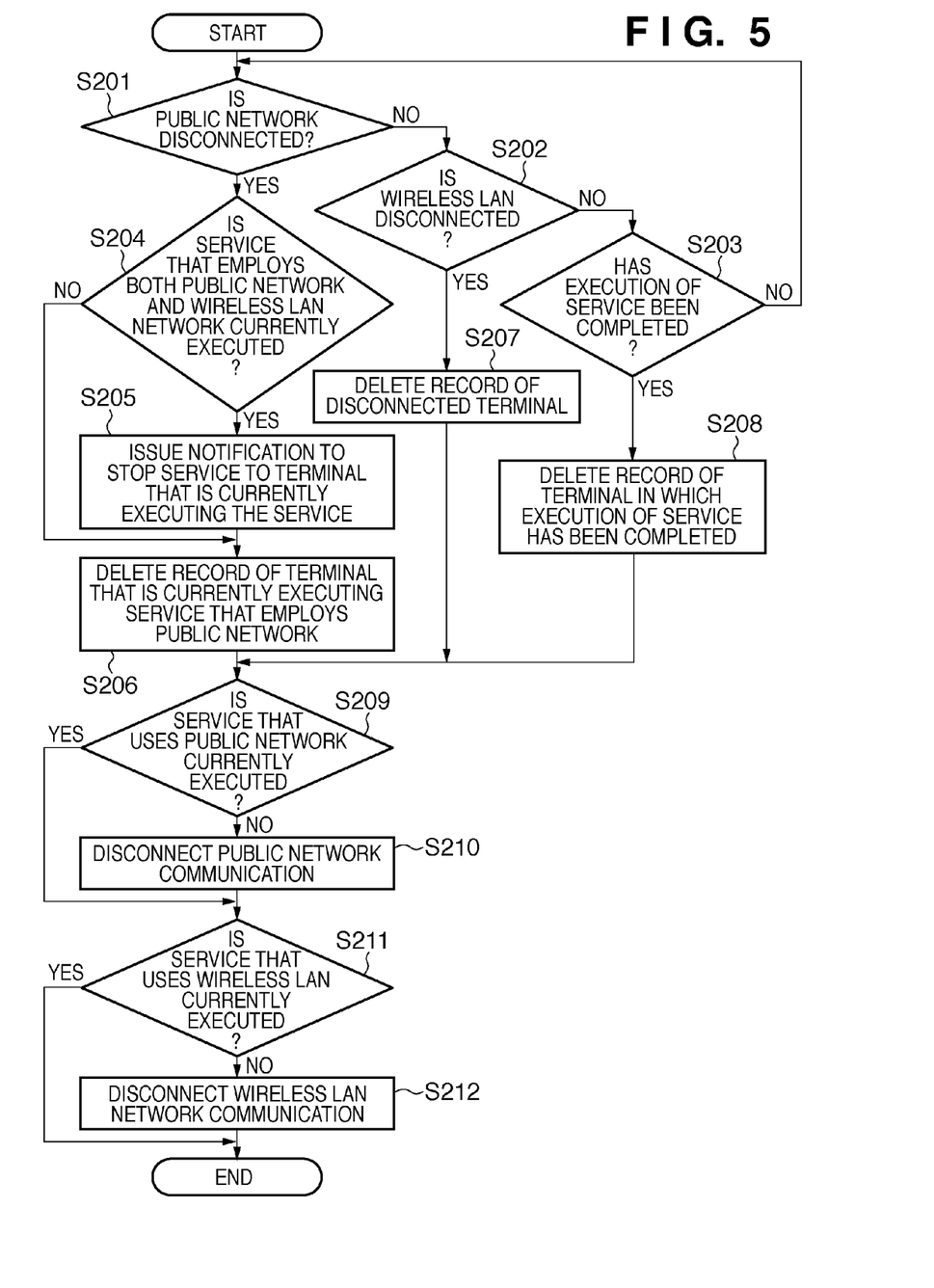
FIG. 5 is a flowchart showing an example of an operation of the mobile phone 1 shown in FIGS. 1 and 2.

Next, an example of an operation of the mobile phone 1 shown in FIG. 1 will be described with reference to FIG. 5. Here, a process for stopping a currently executed service performed by the mobile phone 1 will be described.

The mobile phone 1 is in a service execution state until the service control unit 57 detects completion of service execution or until the first disconnection detection unit 52 or the second disconnection detection unit 55 detects disconnection of communication that is currently taking place (NO in S201 to S203).

If disconnection of public network communication performed with the second communication interface 54 is detected (YES in S201), the mobile phone 1, with the use of the disconnection determining unit 53, determines whether or not a service that uses both a wireless LAN network and a public network is currently executed. Such a determination is made based on whether or not a record in which both wireless LAN network and public network are set in "communication interface used" information exists in the status management table. In the case of the status management table shown in FIG. 3, for example, records Nos. 2 and 3 correspond to such records.

If such a service is currently executed (if such a record exists) (YES in S204), the mobile phone 1, with the use of the communication control unit 56, issues a notification to stop the service to the communication terminal that is currently executing the service (S205). Such a notification is issued via the first communication interface. After that, the mobile phone 1, with the use of the service status management unit 59, deletes the record of the communication terminal that is currently executing the service that uses a public network from the status management table (S206).

If, on the other hand, disconnection of wireless LAN communication is detected during the processing of S201 to S203 (YES in S202), the mobile phone 1, with the use of the service status management unit 59, searches the status management table and deletes the corresponding record. That is, it searches the status management table for a communication terminal (record) whose wireless LAN communication has been disconnected and deletes the record (S207). If, on the other hand, completion of service execution is detected during the processing of S201 to S203 (YES in S203), the mobile phone 1, with the use of the service status management unit 59, searches the status management and deletes the corresponding record. That is, it searches the status management table for a communication terminal (record) in which execution of the service has been completed, and deletes the record (S208).

After the above-described record deleting process spanning from S201 to S208 ends, the mobile phone 1 stops a communication interface that is not in use (S209 to S212). First, the mobile phone 1, with the use of the disconnection determining unit 53, determines whether or not a service that uses a public network is currently executed. Such a determination is made based on the result of the search of the status management table by the service status management unit 59. If such a service is currently executed (YES in S209), the mobile phone 1 advances to the processing of S211. If such a service is not currently executed (NO in S209), the mobile phone 1, with the use of the communication control unit 56, disconnects the public network communication performed with the second communication interface 54 (S210), and then advances to the processing of S211.

Next, the mobile phone 1, with the use of the disconnection determining unit 53, whether or not a service that uses a wireless LAN network is currently executed. Such a determination is made by the service status management unit 59 based on the result of the search of the status management table by the service status management unit 59. If such a service is currently executed (YES in S211), the mobile phone 1 ends the process. If such a service is not currently executed (NO in S211), the mobile phone 1, with the use of the communication control unit 56, disconnects the wireless LAN network communication performed with the first communication interface 51 (S212), and then ends the process.

Next, an example of a communication sequence performed by the communication system shown in FIG. 1 will be described. A processing flow performed when public network communication is disconnected will be described first with reference to FIGS. 3 and 6.

Figure 6:
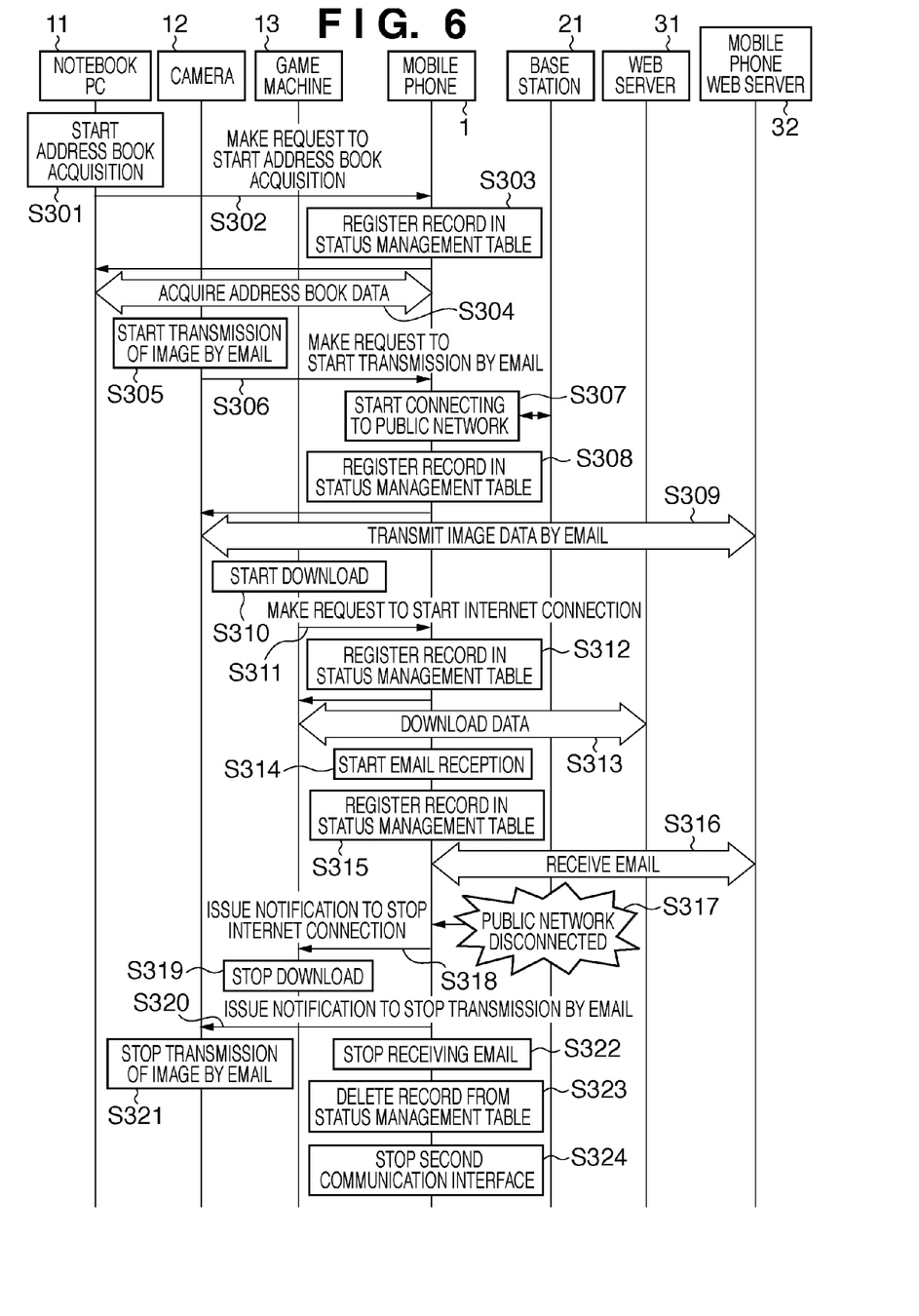
FIG. 6 is a sequence chart showing an example of a communication sequence of the communication system shown in FIG. 1.

It is assumed here that, in the initial state, the mobile phone 1 is not connected to the base station 21 or each terminal (the notebook PC 11, the camera 12, the game machine 13). At this point in time, no record exists in the status management table of the mobile phone 1.

It is assumed that an operator of the notebook PC 11 has issued an instruction to acquire address book data of the mobile phone 1 by operating the notebook PC 11 (S301). The notebook PC 11 therefore transmits a message to the mobile phone 1. Specifically, the notebook PC 11 makes a request to start an address book acquisition service to the mobile phone 1 (S302).

Upon receiving the message, the mobile phone 1, with the use of a service processing unit 58 that processes the service corresponding to the received message, executes a service start process, which will be described later in detail. At this point in time, no record exists in the status management table. This address book acquisition service uses only a wireless LAN network. Accordingly, the mobile phone 1 executes the processing of S107 to S110 described in relation to FIG. 4 (note that NO is selected in S103 and S105). In this case, the notebook PC 11 serves as a service request source, the type of service executed is address book acquisition, and the communication interface used is wireless LAN. Accordingly, in the status management table shown in FIG. 3, a record No. 1 is added (S303). Upon completion of the service start process, the notebook PC 11 acquires address book data from the mobile phone 1 (S304).

Next, it is assumed that an operator of the camera 12 has issued an instruction to transmit image data by email via the mobile phone 1 by operating the camera 12 (S305). The camera 12 therefore transmits a request message to start an email transmission service to the mobile phone 1 (S306).

Upon receiving the message, the mobile phone 1, with the use of a service processing unit 58 that processes the service corresponding to the received message, executes a service start process. At this point in time, a record in which the camera 12 is set as a request source does not exist in the status management table. This email transmission service uses both a wireless LAN network and a public network. Accordingly, the mobile phone 1 executes the processing of S106 to S110 described in relation to FIG. 4 (note that NO is selected in S103, and YES is selected in S105). In this case, the camera 12 serves as a service request source, the type of service executed is email transmission, and the communication interface used is wireless LAN network and public network. Accordingly, in the status management table shown in FIG. 3, a record No. 2 is added (S308). Upon completion of the service start process, the camera 12 starts transmission of image data by email via the mobile phone 1 (S309).

Next, it is assumed that an operator of the game machine 13 has issued an instruction to download data from the web server 31 via the mobile phone 1 by operating the game machine 13 (S310). The game machine 13 transmits a request message to start an Internet connection service to the mobile phone 1 (S311).

Upon receiving the message, the mobile phone 1, with the use of a service processing unit 58 that processes the service corresponding to the received message, executes a service start process. At this point in time, a record in which the game machine 13 is set as a request source does not exist in the status management table. This Internet connection service uses both a wireless LAN network and a public network. Accordingly, the mobile phone 1 executes the processing of S107 to S110 described in relation to FIG. 4 (note that NO is selected in S103 and S105). In this case, the game machine 13 serves as a service request source, the type of service executed is Internet connection service, and the communication interface used is wireless LAN network and public network. Accordingly, in the status management table shown in FIG. 3, a record No. 3 is added (S312). Upon completion of the service start process, the game machine 13 starts downloading data from the web server 31 via the mobile phone 1 (S313).

Next, it is assumed that an operator of the mobile phone 1 has issued an instruction to receive email by operating the mobile phone 1 (S314). The mobile phone 1 therefore, with the use of a service processing unit 58 that corresponds to the processing, executes a service start process. At this point in time, a record in which the mobile phone 1 is set as a request source does not exist in the status management table. This email reception service uses only a public network. Accordingly, the mobile phone 1 executes the processing of S107 to S110 described in relation to FIG. 4 (note that NO is selected in S103 and S105). In this case, the mobile phone 1 serves as a service request source, the type of service executed is email reception, and the communication interface used is public network. Accordingly, in the status management table shown in FIG. 3, a record No. 4 is added (S315). Upon completion of the service start process, the mobile phone 1 starts receiving email from the mobile phone web server 32 (S316).

At the point in time when the processing of S316 has been completed, four services have been simultaneously executed by the mobile phone 1. Accordingly, in the status management table managed by the mobile phone 1, information (the records 1 to 4) shown in FIG. 3 are stored. In this state, it is assumed that the public network communication has been disconnected (S317).

When the second disconnection detection unit 55 detects disconnection of public network communication performed with the second communication interface 54, the mobile phone 1 notifies the communication terminals that are executing a service that uses both a public network and a wireless LAN network to stop communication. Such notification is performed with the first communication interface 51. Specifically, a notification to stop the Internet connection is issued to the game machine 13 (S318) and a notification to stop the email transmission service is issued to the camera 12 (S320). Upon receiving such a notification, the communication terminals (the game machine 13, the camera 12) execute a service end process (S319, S321).

Next, the mobile phone 1, with the use of the service control unit 57, stops a service that uses a public network (S322), and with the use of the service status management unit 59 deletes a record that includes "public network" (S323). In the case of the status management table shown in FIG. 3, the records Nos. 2, 3 and 4 are deleted.

The mobile phone 1, with the use of the disconnection determining unit 53, determines whether or not there is a communication interface that is not in use. Such a determination is made based on the result of search of the status management table by the service status management unit 59. As a result, if an interface that is not in use is found, the mobile phone 1, with the use of the communication control unit 56, stops the communication interface. The operation of the communication interface that is currently in use is continued. In this case, the record No. 1 exists in the status management table shown in FIG. 3. Accordingly, the operation of the first communication interface 51 is continued although the second communication interface 54 is stopped (S324).

Up to this point, a processing flow performed when public network communication is disconnected has been described, but the process described with reference to FIG. 6 is merely an example, and thus can be modified as appropriate. For example, the notebook PC 11, the camera 12, the game machine 13 and the mobile phone 1 may carry out processes other than the above-described processes. In addition, such processes may be carried out in any order.

Next, a process performed when wireless LAN network communication is disconnected will be described with reference to FIGS. 7 and 8.

Figure 7:
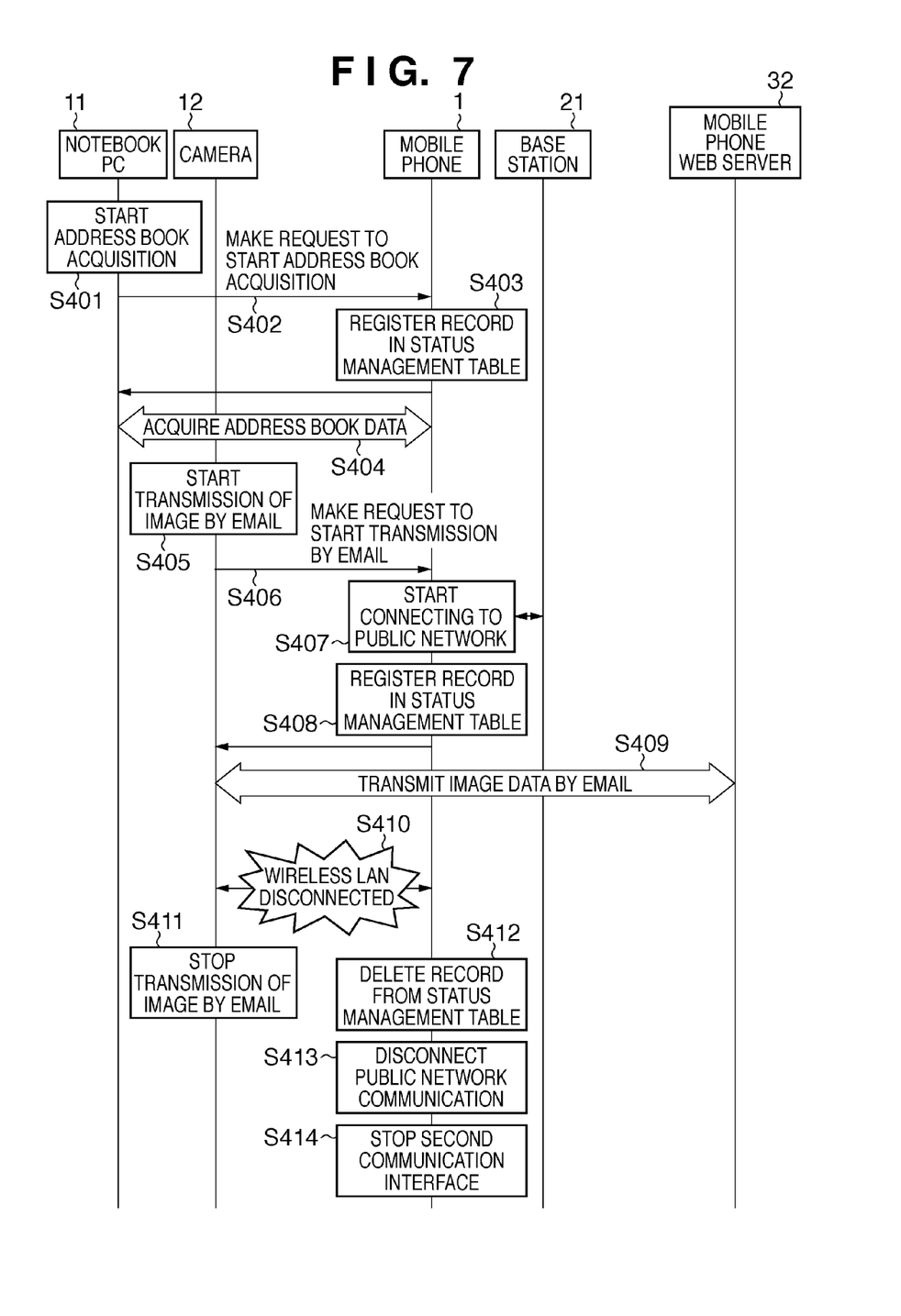
FIG. 7 is a sequence chart showing an example of a communication sequence of the communication system shown in FIG. 1.
Figure 8:
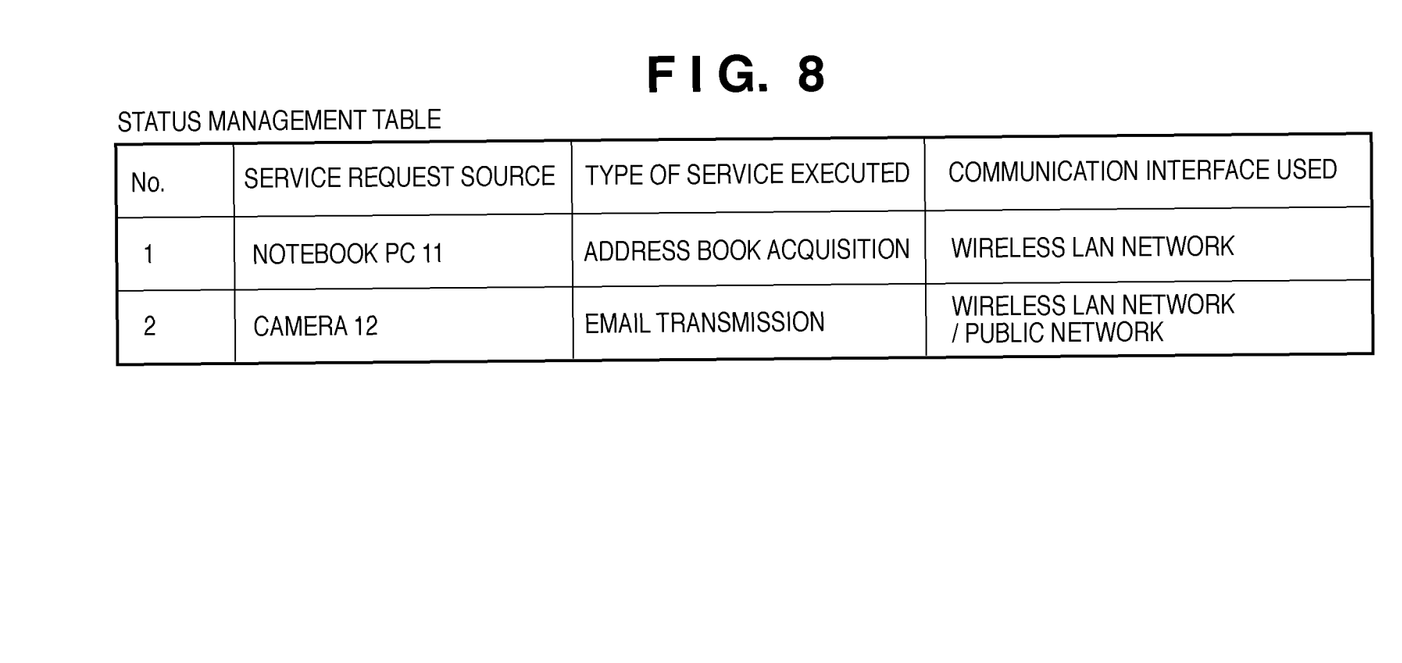
FIG. 8 is a diagram showing an example of a table layout of a status management table.

In FIG. 7, as in the case of FIG. 6 described above, an address book data acquisition service is executed between the mobile phone 1 and the notebook PC 11, and an email transmission service is executed between the mobile phone 1 and the camera 12 (S401 to S409). Here, a status management table shown in FIG. 8 is stored in the service status management unit 59 of the mobile phone 1. In this state, it is assumed that the wireless LAN communication between the mobile phone 1 and the camera 12 is disconnected for some reason (S410).

In the mobile phone 1, when the first disconnection detection unit 52 detects disconnection of the wireless LAN network communication performed with the first communication interface 51, the service status management unit 59 identifies a communication terminal whose communication has been disconnected. Such identification is performed by, for example, searching "service request source" information of each record in the status management table. In the case of the status management table shown in FIG. 8, a record No. 2 corresponds to such a record. The mobile phone 1, with the use of the service status management unit 59, deletes the corresponding record (S412).

After that, the same process as that of FIG. 6 described above is carried out. That is, the mobile phone 1 determines whether or not there is a communication interface that is not in use, and if such an interface is found, stops the operation of the interface. In this case, a record No. 1 exists in the status management table shown in FIG. 8. Accordingly, the operation of the first communication interface 51 is continued although the second communication interface 54 is stopped (S413 and S414).

As described above, according to the present embodiment, it is possible to simultaneously provide a plurality of services via a plurality of communication interfaces and to accurately disconnect communication that is performed with each communication interface. For example, when public network communication is disconnected, it is possible to notify only a communication terminal that uses a public network that the public network has been disconnected, and also that a service associated with the public network communication should be stopped.

With the above-described configuration, it is possible to reduce consumption of communication bands due to the occurrence of unwanted communication, the malfunction of a communication terminal caused by receiving of an unwanted message, and the like. In addition, the operation of a communication interface that is not in use for communication can be stopped rapidly, as a result of which it is possible to achieve power-saving.

Thus far, an example of a representative embodiment of the present invention has been described, but the present invention is not limited to the embodiment described above and shown in the drawings, and the present invention can be modified as appropriate without departing from the gist thereof.

For example, in the above description, a service is quickly stopped upon detection of disconnection of public network communication, but it is also possible to employ a configuration in which a restoring process, such as reconnection, is executed instead of quickly stopping the service. In this case, if the restoring process fails, a process for stopping the service is carried out.

In addition, in the above description, an instruction message to stop a service is transmitted from the mobile phone 1 to each communication terminal, but the configuration is not limited thereto, and it is also possible to disconnect communication for notification. Specifically, for example, instead of transmitting a notification, the wireless LAN connection between the mobile phone 1 and each communication terminal may be disconnected.

In addition, in the above description, communication performed with a communication interface is disconnected when a service is stopped, but the configuration is not limited to disconnection of communication performed with a communication interface, and it is also possible to, for example, bring a communication function unit of the communication interface into a power off state or power saving state. In this case, power-saving can be achieved.

In addition, the foregoing has been described taking the mobile phone 1 as an example, but the above-described processes may be performed by a communication terminal other than a mobile phone. For example, such a communication terminal other than a mobile phone can be any information processing apparatus as long as it includes a plurality of communication interfaces and provides a plurality of services via the communication interfaces.

According to the present invention, it is possible to simultaneously provide a plurality of services via a plurality of communication interfaces and to accurately disconnect communication that is performed with each communication interface.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-058700 filed on Mar. 11, 2009, which is hereby incorporated by reference herein in its entirety.

What is claimed is:

1. A communication apparatus comprising:
 a first communication unit constructed to communicate with a plurality of another apparatuses by first wireless communication complied with a first wireless communication protocol;
 a second communication unit constructed to communicate with a base station by second wireless communication complied with a second wireless communication protocol being different from the first wireless communication protocol;
 a determination unit constructed to determine a plurality of apparatuses using the second wireless communication among the plurality of another apparatuses communicating by the first wireless communication;
 a detection unit constructed to detect disconnection of the second wireless communication performed with the base station; and a control unit constructed to disconnect the first wireless communication performed with the plurality of apparatuses using the second wireless communication determined by the determination unit in a case where the detection unit detects the disconnection of the second wireless communication performed with the base station, and maintain the first wireless communication performed with another apparatus which does not use the second wireless communication among the plurality of another apparatuses.

2. The communication apparatus according to claim 1, wherein in a case where disconnection of the communication complied with the second communication protocol has been detected by the detection unit, the control unit issues, to a communication apparatus that is currently executing a service that uses the second wireless communication protocol, a notification to stop the currently executed service by using the first communication protocol.

3. The communication apparatus according to claim 1, further comprising a power control unit constructed to bring a communication function unit of the communication unit that is not in use into a power off state or power saving state, in a case where there is a communication protocol that is not in use by a result of processing by the control unit.

4. A communication processing method of a communication apparatus, the method comprising:

a first communication step of communicating with a plurality of another apparatuses by first wireless communication complied with a first wireless communication protocol;

a second communication step of communicating with a base station by second wireless communication complied with a second wireless communication protocol being different from the first wireless communication protocol;

a determination step of determining a plurality of apparatuses using the second wireless communication among the plurality of another apparatuses communicating by the first wireless communication;

a detecting step of detecting disconnection of the second wireless communication performed with the base station; and a control step of disconnecting the first wireless communication performed with the plurality of apparatuses using the second wireless communication determined in the determination step in a case where the detection step detects the disconnection of the second wireless communication performed with the base station, and maintaining the first wireless communication performed with another apparatus which does not use the second wireless communication among the plurality of another apparatuses.

5. The communication apparatus according to claim 1, further comprising a management unit constructed to manage, regarding each of the services, information indicating that each of the services is a first service or is a second service, and wherein the control unit controls the first wireless communication complied with the first wireless communication protocol and the second wireless communication complied with the second wireless communication based on the information managed by the management unit.

6. A non-transitory computer readable memory storing a program which causes a computer to function as each unit of a communication apparatus according to claim 1.

* * * * *